Patented Apr. 28, 1931

1,802,818

UNITED STATES PATENT OFFICE

WILLIAM SCOTT HUTCHINSON, OF SCARSDALE, NEW YORK, ASSIGNOR, BY MESNE ASSIGNMENTS, TO LEKTOPHONE CORPORATION, OF JERSEY CITY, NEW JERSEY, A CORPORATION OF DELAWARE

TREATING STORAGE-BATTERY PLATES

No Drawing.　　　Application filed October 27, 1925. Serial No. 65,246.

This invention relates to the treatment of storage battery plates of the pasted or Fauré type whereby the expense and labor of the manufacture of such plates are greatly reduced.

It has been the usual practice in making such plates to form a mix or paste of lead oxide or lead oxides or of such oxide or oxides and lead sulphate to which is added sulphuric acid of considerably less specific gravity than that employed as the elctrolyte in the operation of the battery in normal use. This mix is then pasted on the grid. The pasted grids or plates are then "pickled" by immersion in comparatively dilute sulphuric acid, usually about 1100 specific gravity. The plates either singly or assembled in groups as may be desired to form the elements, that is the anode and cathode, of a battery and are then "formed" (converting the paste into lead peroxide and spongy lead in the positive and negative plates respectively by the electric current, the positive element being made the anode) in a solution of dilute acid, say about 1100 specific gravity. When "formation" is complete, the elements are immersed in their jars or containers, the electrolyte being sulphuric acid usually of a specific gravity of 1300, and the battery is continued in its normal use in this electrolyte. The use of two acid solutions as referred to above, is costly and calls for several operations.

The main object of the present invention is to reduce the labor and cost. This is accomplished by using but one acid solution in treating the plates as compared with a number of acid solutions as noted above. This result may be brought about by treating the pasted plates in acid solutions of such specific gravity and so constituting the paste or active material that the acid liberated from the paste during the treatment will increase the specific gravity to the value desired in the electrolyte for normal operation of the cell.

This may be done by causing the paste containing the usual lead oxides to have a high sulphate content. To accomplish this sulphuric acid of a higher specific gravity than that ordinarily used may be employed in the mix and this forms sulphate which, when desulphation takes place, gives up acid to the electrolyte or acid solution and thereby raises its specific gravity. The proportions of ingredients whereby the right amount of acid thus given up from the paste to the solution to bring the electrolyte up to the desired specific gravity, may readily be calculated from the specific ingredients and specific gravities of the acids employed, by those skilled in the production of battery plates.

Instead of using an acid of high specific gravity in the mix or paste, the usual dilute acid may be employed and a very finely divided lead sulphate added. A sulphate suitable for this purpose is such as is made by the process as described in the Patent No. 1,524,314 John A. Schaefer, John H. Caldbeck and Bernard S. White, patented January 27, 1925. Such lead sulphate is readily desulphated when it receives the current.

The desired sulphate in the paste may also be produced by both adding high gravity acid and finely divided sulphate in suitable amounts.

When the sulphate is obtained in the mix, either by using the high gravity acid in the mix or by using the dry finely divided lead sulphate, or both, which is carefully calculated from the standpoint of producing a certain amount of sulphuric acid when it is desulphated. In this way it is possible to start with an electrolyte or acid of a definite strength or specific gravity and know that when the sulphate in the paste is desulphated an additional amount of sulphuric acid will be produced and raise the specific gravity of the electrolyte by such desulphation, to any given point depending upon the amount of sulphate that is in or is produced in the plate and which is under control by putting a measured amount of acid or a given weight of lead sulphate, or both, in the mix.

Heretofore it was not practicable to employ an acid solution of as high specific gravity as is contemplated in the present process. While it is not wished to limit the present invention to any theory in this regard, it is the understanding that this is true because when dry, pasted storage battery plates, especially plates made of material with a high percentage of litharge, are immersed in sulphuric acid, especially acid high in gravity (and particularly the more reactive the litharge or oxide of lead) lead sulphate is formed immediately. The formation of the lead sulphate causes a great expansion in volume tending to close the pores and to prevent diffusion to the interior of the plate. Inasmuch as the surface of the plate is first attacked by the acid the lead sulphate there formed tends to create a skin or membrane of small thickness and of such density as to shut off the acid from the interior of the plate and when, in the usual procedure, formation is proceeded with in such high gravity acid, the "formation" of the plate is substantially limited to the small thickness of the skin or membrane. The result is low capacity and the practical failure of "formation" in high gravity acid.

By the present process the prevention of incomplete formation in high gravity acid is avoided by intermittently applying electric current, current being applied as in the ordinary development of plates but intermittently. The action then is, as I understand it, that the sulphate formed on the plate at the surface during the period of no current flow whereby the sulphate barrier to the diffusion of the acid solution into the plate, is removed, the solution then permeates further into the plate forming more sulphate during the succeeding period of no current, and this is again desulphated during the succeeding period of current flow and so the periods of current flow and current cessation are continued alternately until the treatment of the plate is complete.

Also it may be observed that the successful operation of the present process of treatment in high gravity acid as herein set forth, is believed to be largely due to the formation of the sulphate in the paste before it is applied to the grid so that the usual expansion (whereby the pores are practically closed and the "membrane" formed) in the formation of the sulphate on immersion in high gravity acid is avoided, and the closing of the pores therefor proceeds to a much more limited extent so that the diffusion of the acid into the paste is much less interfered with.

The action seems to be aided if the condition is such that there is maintained a small percentage of the peroxide of lead (which is in contact with the acid in the paste) and which is diffused throughout the paste so that the "membrane" or impervious layer of sulphate is not complete but has intermixed in it crystals of lead peroxide which maintain porosity to a limited extent so that during the periods at which current is applied the solution can penetrate to a sufficient extent to effect the operations as above indicated.

As a concrete illustration of the application of the invention, the positive plates may be formed as follows:

The paste may be made up of 2200 grams of material consisting of litharge 90% and red lead 10% to which is added 10% by weight of dry superfine lead sulphate, the whole being thoroughly mixed in a hand mixer. To this mixture is added, and thoroughly mixed therein, 120 grams of water so as to moisten the oxide, and then 313 cubic centimeters of sulphuric acid of specific gravity of 1250 is very slowly added with steady mixing of the material. This produces a mass of paste of the desired plasticity which is then pasted on a suitable grid (for instance the standard starter grid which is about $\frac{1}{8}$ of an inch thick), and the pasted grid is then dried.

The negative plates may be made as follows:

In this case the material may be the same as in the case of the positive plates, namely litharge 90% and red lead 10% to which 10% of the superfine lead sulphate has been added, the red lead and litharge amounting to 2200 grams. The mixing, however, is proceeded with according to the common practice namely, mixing with the aforesaid material sulphuric acid of 1100 specific gravity, the materials being thoroughly mixed. This is pasted on a grid which may be the regular standing grid $\frac{3}{32}$ of an inch thick and the whole is then dried.

A seven plate cell may then be made up by taking four of the dried untreated pasted negative plates and three of the dried positive untreated pasted plates, prepared as above, and grouping them into the desired elements in the usual way, with the separators, and placing them in the regular standard jar for that number of plates, which will hold about 600 cubic centimeters of solution, and the jar is filled with sulphuric acid solution of specific gravity 1240. The cell is then sealed in the regular way and is ready for the current treatment. Current is then applied at the rate of 6 amperes for a period of five hours, current is then turned off for a succeeding period of three hours, the current is then applied for a succeeding period of three hours, current is then turned off for a succeeding period of four hours, current is again applied for a succeeding period of eight hours and turned off for a succeeding period of four hours when the current was again turned on until the treatment was completed which occurred within four and one-half hours, the specific gravity of the acid solution then being 1280. The usual discharge is then taken and on recharge the solution reached a specific gravity of 1290 which is appropriate for the battery during normal use.

It will thus be seen that by this process the desired service conditions may be attained by placing plates constituting the battery elements (either single plates or groups) in the service container and there administering their treatment without change of the acid solution or bath or in any way disturbing the plates after they have once been assembled in the untreated pasted condition in the container with the one acid solution.

A convenient index for the periods of application of current and cessation of current in the treatment of the plates although such index need not be strictly followed, is formed in the change of specific gravity of the solution. During a period of cessation of current sulphation takes place with consequent absorption of acid and lowering of specific gravity of the solution. When it is observed that the specific gravity does not substantially lower upon continuation of current cessation, the sulphation has reached its approximate limit and further continuation of the cessation period is futile. The current should now be applied and, resulting in desulphation, causes acid to be liberated which passes into the solution and raises its specific gravity. This continues until the desulphation has proceeded to its limit when the specific gravity of the solution will no longer substantially rise and it is then appropriate to discontinue the period of current flow and cause a cessation of current for a period such that the specific gravity of the solution no longer substantially lowers when the current should be again applied and continued until the specific gravity no longer substantially rises and so that periods of cessation and application are alternated until the treatment of the plate is complete.

While the invention has been set forth by means of a concrete example of its application and also the reasons for its operation and its principal features have been set forth to the best of applicant's understanding, it is to be understood that the invention is not limited to the details of the process recited or to the reasons or theory of its operation as such details may be widely varied without departing from the spirit of the invention and there may be other reasons for the operation than those set forth.

What I claim is:

The method of manufacturing storage battery cells which comprises applying to the plate grids a paste which contains prior to its application to the grids an oxide of lead and lead sulphate, forming the plates in a service container by placing them in the container with sulphuric acid having a specific gravity of at least 1.2 and passing an electric current through the plates, the amounts of the ingredients in the paste when applied to the grids being so calculated with respect to the specific gravity of the sulphuric acid that the forming operation will bring the sulphuric acid up to its normal operating strength.

In testimony whereof I have signed this specification this 26th day of October, 1925.

WILLIAM SCOTT HUTCHINSON.